US012792652B2

(12) United States Patent
Kim et al.

(10) Patent No.: US 12,792,652 B2
(45) Date of Patent: Nov. 10, 2026

(54) APPARATUS AND METHOD WITH DEFECT-CAUSE RECOMMENDING

(71) Applicant: SAMSUNG ELECTRONICS CO., LTD., Suwon-si (KR)

(72) Inventors: Heewon Kim, Suwon-si (KR); Jin Young Shin, Suwon-si (KR); Hyun Sung Chang, Suwon-si (KR); Byung In Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 18/826,649

(22) Filed: Sep. 6, 2024

(65) Prior Publication Data

US 2025/0322001 A1 Oct. 16, 2025

(30) Foreign Application Priority Data

Apr. 11, 2024 (KR) ........................ 10-2024-0048829

(51) Int. Cl.

| | |
|---|---|
| ***G06F 16/3329*** | (2025.01) |
| ***G06F 16/334*** | (2025.01) |
| ***G06F 16/338*** | (2019.01) |

(52) U.S. Cl.

CPC ...... *G06F 16/3347* (2019.01); *G06F 16/3329* (2019.01); *G06F 16/338* (2019.01)

(58) Field of Classification Search

None

See application file for complete search history.

(56) References Cited

U.S. PATENT DOCUMENTS

| | | | | |
|---|---|---|---|---|
| 2003/0061212 | A1* | 3/2003 | Smith | G06F 16/2453 |
| 2010/0131450 | A1* | 5/2010 | Nguyen | G06F 16/90 |
| 2011/0161938 | A1* | 6/2011 | Marum | G06F 16/35<br>707/706 |
| 2016/0239487 | A1* | 8/2016 | Potharaju | G06F 16/24578 |
| 2018/0299877 | A1* | 10/2018 | Cheng | G06F 16/45 |
| 2021/0398831 | A1 | 12/2021 | Oberai et al. | |
| 2022/0375056 | A1* | 11/2022 | Weiss | G06F 16/35 |
| 2024/0248901 | A1* | 7/2024 | Krishnan | G06F 16/24578 |
| 2025/0005048 | A1* | 1/2025 | Java | G06F 16/43 |
| 2025/0245813 | A1* | 7/2025 | Shukla | G06F 16/90 |
| 2025/0371843 | A1* | 12/2025 | Bertrand | G06F 16/73 |

FOREIGN PATENT DOCUMENTS

| | | | |
|---|---|---|---|
| JP | 2003-059984 | A | 2/2003 |
| JP | 2023-549331 | A | 11/2023 |
| KR | 10-2020-0067305 | A | 6/2020 |
| KR | 10-2328842 | B1 | 11/2021 |
| KR | 10-2582354 | B1 | 9/2023 |

* cited by examiner

*Primary Examiner* — Son T Hoang

(74) *Attorney, Agent, or Firm* — NSIP Law

(57) ABSTRACT

An apparatus for recommending a defect-causing process includes a communication interface configured to receive a user's inquiry including identification information related to a defect phenomenon occurring in a target process, and a neural network model configured to search for a similar case related to the defect phenomenon by encoding information related to the defect phenomenon based on the identification information and generate a response to the user's inquiry by using a prompt generated based on the user's inquiry and the similar case.

15 Claims, 10 Drawing Sheets

APPARATUS AND METHOD WITH DEFECT-CAUSE RECOMMENDING

CROSS-REFERENCE TO RELATED APPLICATIONS

This application claims the benefit under 35 USC § 119 (a) of Korean Patent Application No. 10-2024-0048829, filed on Apr. 11, 2024, in the Korean Intellectual Property Office, the entire disclosure of which is incorporated herein by reference for all purposes.

BACKGROUND

1. Field

The following description relates to an apparatus and method with defect-cause recommending.

2. Description of Related Art

When a defect occurs in a target process, like a semiconductor manufacturing process, experts may identify a defect-causing process (a process that caused the defect) and may take action through the following processes. First, when a sample that has gone through an inspection step is determined to be defective, human experts may classify defect patterns, and then may directly identify a defect-suspected facility (a facility suspected of causing defects) through cross-analysis with past defect history.

However, a search for a defect cause by human experts requires a significant amount of time, may not respond to various linguistic inquiries, and analysis on a defect-suspected facility may be difficult to find through cross-analysis without a separate analysis system. In addition, when intending to classify defect patterns by using defect images, important pieces of information of an image may be lost in a process of codifying the characteristics of the defect images into one class.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for recommending a defect-causing process includes one or more processors and memory storing instructions configured to cause the one or more processors to: receive a user's inquiry including identification information related to a defect phenomenon occurring in a target process; and implement a neural network model configured to search for a similar case related to the defect phenomenon by encoding information related to the defect phenomenon based on the identification information and generating a response to the user's inquiry by using a prompt generated based on the user's inquiry and the similar case.

The neural network model may include: an encoder module configured to extract a first feature corresponding to a first modality and/or a second feature corresponding to a second modality by encoding the information related to the defect phenomenon based on the identification information; a matching module configured to search for the similar case, the similar case including a suspected process, a suspected facility and/or a suspected chamber that match a query vector, through the query vector, based on the first and/or second feature; a paraphrasing module configured to generate the prompt based on the user's inquiry and the similar case; and a large language model configured to generate the response corresponding to the user's inquiry by using the prompt.

The encoder module may include: a preprocessor configured to convert the information related to the defect phenomenon into a form for the encoding, based on the identification information; a first encoder configured to extract the first feature from the converted information related to the defect phenomenon; or a second encoder configured to extract the second feature from the converted information related to the defect phenomenon.

The encoder module may include a transformer-based encoder network.

The matching module may be configured to match the suspect facility and the suspected chamber, corresponding to the suspected process, with the query vector, based on production information.

The matching module may include: an adapter configured to convert the first feature and the second feature into the query vector; a retriever configured to search sample cases to find the similar case, the similar case including the suspected process that matches the query vector; and a masking module configured to derive the suspected process by masking, based on production information, some of the sample cases.

The adapter may be further configured to fuse the first feature and the second feature through a feed-forward network and convert the fusion of the first and second features into the query vector.

The feed-forward network may be trained through an inductive bias that reflects the knowledge of an expert in the target process, and configured to calculate a probabilities of candidates of the suspected process.

The retriever may be configured to calculate a similarity between the query vector and the similar case based on a scaled dot-product attention, and search for the suspected process through non-parametric classification, which converts the similarity into probabilities of suspected processes similar to the query vector.

The retriever may be trained based on cross-entropy corresponding to an occurrence probabilities of suspected processes similar to the query vector.

The apparatus may further include: a data frame module configured to collect the suspected process, the suspected facility, and the suspected chamber corresponding to an unmasked similar case and convert the collected suspected process, facility, and chamber into information in a standardized form.

The paraphrasing module may be configured to generate the prompt for the large language model based on the user's inquiry, the suspected process, the suspected facility, and/or the suspected chamber.

The first modality may include text information, and the second modality may include image information.

The information related to the defect phenomenon may include: at least one piece of text information of LOT information related to the target process, an inspection step related to the target process, wafer information, a defect-type code, and production information; and image information including a defect image corresponding to the defect phenomenon or a pattern of a defect map corresponding to the defect phenomenon.

The response corresponding to the user's inquiry may include: a response reflecting the user's inquiry, the suspected process, the suspected facility, the suspected chamber, and/or the at least one similar case.

In another general aspect, a method of recommending a defect-causing process is performed by one or more processors includes: receiving a user's inquiry including identification information related to a defect phenomenon occurring in a target process; extracting a first feature corresponding to a first modality and/or a second feature corresponding to a second modality by encoding the information related to the defect phenomenon based on the identification information; determine a query vector from the first and/or second feature; searching for a similar case including a suspected process, a suspected facility, and/or a suspected chamber, which matches the query vector; and generating a response to the user's inquiry by using a prompt generated based on the user's inquiry and the similar case.

The extracting the first and/or second feature may include: preprocessing to convert the information related to the defect phenomenon into a form for the encoding, based on the identification information; extracting the first feature from the converted information related to the defect phenomenon; and extracting the second feature from the converted information related to the defect phenomenon.

The searching for the similar case may include: converting the first and/or second feature into the query vector; and searching for the similar case, the similar case including the suspected process that matches the query vector.

The searching for the similar case may include: calculating a similarity between the query vector and the similar case based on a scaled dot-product attention; searching for the suspected process through non-parametric classification, which converts the similarity into a probability of suspected processes similar to the query vector; and matching the suspect facility and the suspected chamber, corresponding to the suspected process, with the query vector, based on production information.

In another general aspect, a method of recommending a defect-causing process is performed by one or more processors and includes: receiving a user's inquiry including identification information related to a defect phenomenon occurring in a target process; converting information related to the defect phenomenon included in a defect log into a form for encoding, the information related to the defect phenomenon obtained based on the identification information; extracting a first feature corresponding to a first modality included in the converted information related to the defect phenomenon and/or a second feature corresponding to a second modality included in the converted information related to the defect phenomenon; converting the first and/or second feature into a query vector; searching for the similar case, the similar case including a suspected process that matches the query vector; matching a suspected facility and a suspected chamber, corresponding to the defect phenomenon, based on production information corresponding to the similar case; generating a prompt for a large language model based on the user's inquiry, the suspected process, the suspected facility, and/or the suspected chamber; and generating a response corresponding to the user's inquiry by using the prompt.

Other features and aspects will be apparent from the following detailed description, the drawings, and the claims.

Figure 1:
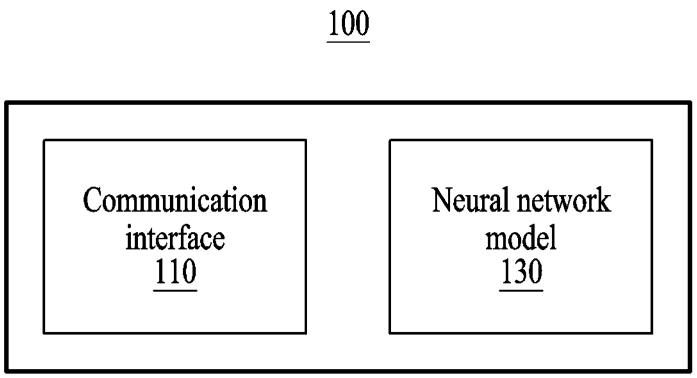
FIG. 1 is a block diagram illustrating an apparatus for recommending a defect-causing process, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 is a block diagram illustrating an apparatus for recommending a defect-causing process, according to an embodiment. Referring to FIG. 1, an apparatus for recommending a defect-causing process (hereinafter, the "recommendation device") 100 in a target process, according to an embodiment, includes a communication interface 110 and a neural network model 130.

The communication interface 110 may receive a user's inquiry (query), which may include identification information related to a defect phenomenon occurring in the target process. The target process (the process of interest) may be, for example, any of various manufacturing processes (including processes other than a semiconductor manufacturing process) and/or new-material development processes in which a defect may occur. The identification information related to a defect phenomenon may include, for example, information of a tray of wafers or a LOT identification (ID) corresponding to a rack, as non-limiting examples.

The neural network model 130 may search for a similar case related to a defect phenomenon by encoding the information related to the defect phenomenon, based on the identification information received through the communication interface 110. The neural network model 130 may generate a response to the user's defect inquiry by using a prompt generated based on (i) the user's inquiry and (ii) the similar case.

Here, the "prompt" may be text information in a command (structured) or sentence (natural language) form. The prompt may provide appropriate direction and prior information to a language model (e.g., a large language model (LLM)) to induce artificial intelligence (AI) to exert maximum performance such that a desired result is obtained. In other words, the prompt may be specific input text information and/or question text information that guides the language model, in a supplementary fashion, when the user intends to generate a desired output for a primary input supplemented by the prompt. The prompt may be a starting point for the LLM to generate an output, and the quality and clarity of the prompt may have a significant influence on the output generated by the LLM.

The "information related to a defect phenomenon" may be data indicating/about the defect phenomenon and may include text information and image information. The text information may include, for example, LOT information (e.g., an identifier of a production lot) related to the target process, an inspection step related to the target process, wafer information, a defect-type code, and/or production information. The image information may be a defect image corresponding to the defect phenomenon (an image of a defect) and/or a pattern of a defect map corresponding to the defect phenomenon (e.g., a map derived from a defect image).

In addition, the response corresponding to the user's inquiry may include a response reflecting the user's inquiry, a suspected process, a suspected facility, a suspected chamber, and/or at least one similar case. Hereinafter, the phrase "suspected process" refers to a process in which a defect is suspected to have occurred. The phrase "suspected facility" refers to a facility in which a defect is suspected to have occurred. In addition, the phrase "suspected chamber" refers to a chamber in which a defect is suspected to have occurred.

To summarize, when a defect is detected in the target process (e.g., the semiconductor manufacturing process), the recommendation device 100 may identify various defect causes related to the defect phenomenon, may find a defect cause, and may take action to normalize the defect. The defect cause may include, for example, a manufacturing process, a manufacturing facility, or a manufacturing chamber, as non-limiting examples. In other words, the recommendation device 100 may isolate a particular process, stage, or location that caused the detected defect.

The recommendation device 100 may recommend (propose or predict) a defect cause (e.g., process, stage, location, etc.) by synthesizing (e.g., inferring from) grounds (bases) for the determination of the defect phenomenon through the neural network model 130, which may do so based on text information like an anomaly detection code (e.g., a defect-type code used by a manufacturer), a pattern of a defect map corresponding to the defect phenomenon, and/or image information like a defect image. In addition, the recommendation device 100 may automatically generate an integral description of a defect-causing process through generative AI, like an LLM (e.g., an LLM 270 shown in FIG. 2), included in the neural network model 130 and may provide the generated integral description as a response to the previously-mentioned user's inquiry.

The neural network model 130 may classify, for example, at least one defect type of a defect image and/or a defect map corresponding to the defect phenomenon when a sample, which has gone through an inspection step, is determined to be defective. The neural network model 130 may recommend a suspected facility and/or process by (i) analyzing classified defect types, the defect history of facilities/processes (e.g., logs associating defects with facilities/processes, the production information (e.g., facility/process history or congestion history) of a wafer, and (ii) comparing a result of the analyzing it with a database (DB). As such, the neural network model 130 may recommend/predict a defect-causing process/facility by analyzing a defect image and a process anomaly. Detailed structure and operation of an example of the neural network model 130 are described with reference to FIGS. 2 and 3.

Figure 2:
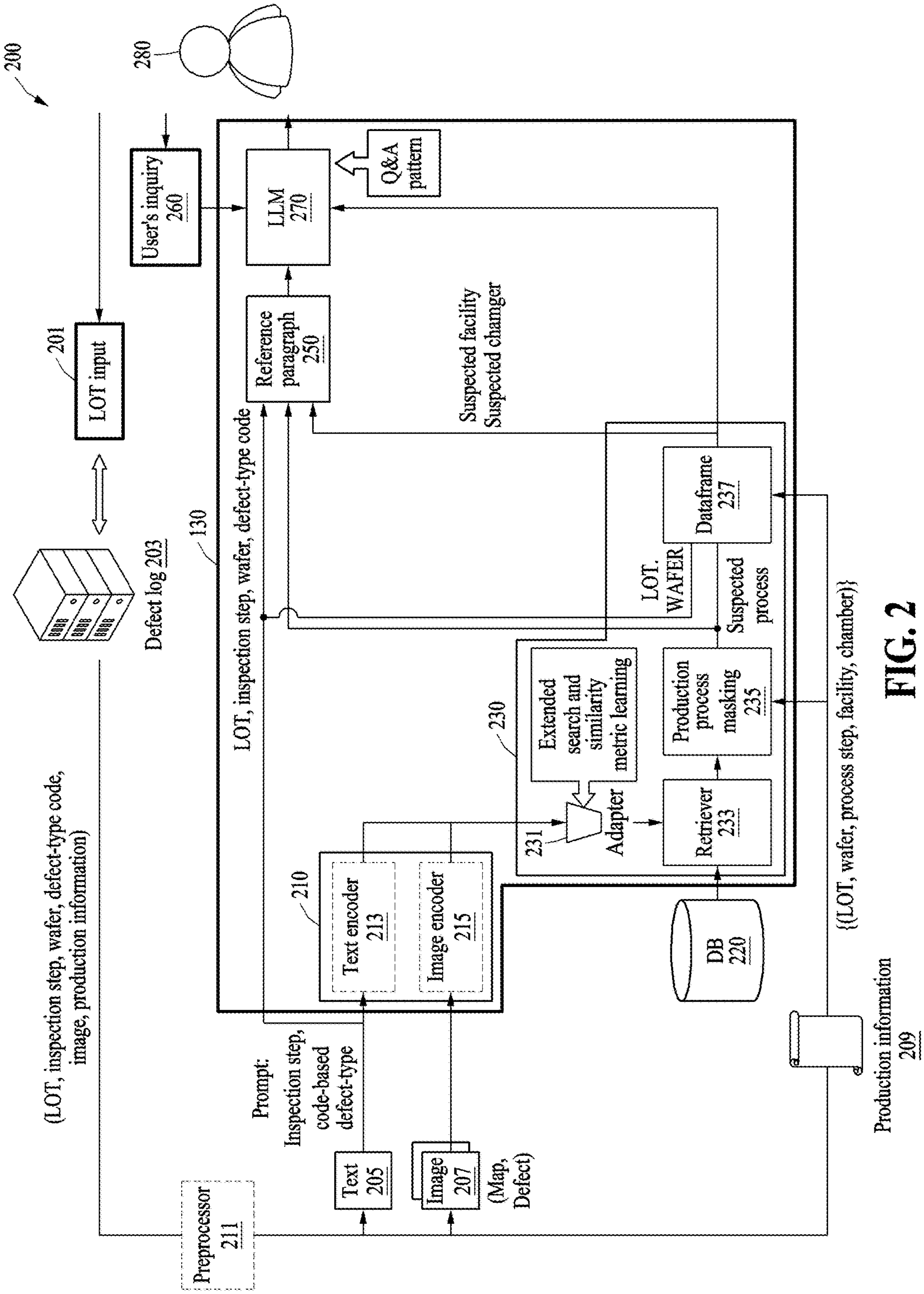
FIG. 2 illustrates an example of a configuration and operation of the apparatus for recommending a defect-causing process, according to one or more embodiments.

FIG. 2 illustrates an example of a configuration and operation of the apparatus for recommending a defect-causing process/facility, according to one or more embodiments. Referring to FIG. 2, the neural network model 130 may include an encoder module 210, a matching module 230, a paraphrasing module 250, and the LLM 270. The LLM 270 is described as included in the neural network model 130 in the embodiments of FIG. 2, but embodiments are not limited thereto; the LLM 270 may be separate from the neural network model 130.

The encoder module 210 may extract a first feature corresponding to a first modality (e.g., text) and a second feature corresponding to a second modality (e.g., image) by encoding text information 205 and image information 207 that is related to a defect phenomenon; the respective encodings may be based on the identification information related to the defect phenomenon (described earlier). The first modality may include the text information 205 and the second modality may include the image information 207, but examples are not limited thereto. The encoder module 210 may be a transformer-based encoder network, for example.

The encoder module 210 may include, for example, a preprocessor 211, a first encoder 213, and a second encoder 215.

The preprocessor 211 may convert the information related to the defect phenomenon into a form to be encoded by first and second encoders 213, 215. When a user 208 inputs a LOT ID 201 and a user's inquiry 260 related to the LOT ID 201, the information related to the defect phenomenon (e.g., LOT information, an inspection step, wafer information, a defect-type code, a defect image, production information 209, etc.) may (i) be obtained from a defect log 203 (e.g., based on the LOT ID 201) and (ii) converted into the form to be encoded by the first and second encoders 213, 215. The preprocessor 211 may be unnecessary, depending on the form of data that is input to the first and/or second encoders 213, 215.

The first encoder 213 may extract the first feature from the converted information (related to the defect phenomenon). The first encoder 213 may be a text encoder configured/trained for extracting features from text inputs. The first feature may be a text feature corresponding to the first modality (e.g., the text information).

The second encoder 215 may extract the second feature from the converted information related to the defect phenomenon. The second encoder 215 may be an image encoder configured/trained for extracting feature from images (here, "images" is used in the broadest sense, and includes image-related information such as defect maps). The second feature may be an image feature corresponding to the second modality (e.g., the image information).

The matching module 230 may obtain the similar case (a suspected process, a suspected facility, or a suspected chamber) by searching for a case which matches a query vector based on at least one of the features extracted by the encoder module 210. The matching module 230 may derive the suspected process and may match the suspect facility and the suspected chamber, corresponding to the suspected process, with the query vector, based on production information 209.

The matching module 230 may include, for example, an adapter 231, a retriever 233, a masking module 235, and a data frame module 237, each described next.

The adapter 231 may convert the first feature obtained from the first encoder 213 and the second feature obtained from the second encoder 215 into the query vector. For example, the adapter 231 may be configured to fuse or synthesize two types of features, and accordingly, may fuse/synthesize the first feature and the second feature, through a feed-forward network and thereby convert the first and second feature vectors into one query vector. The feed-forward network may be a neural network having a structure in which an input value is transmitted in one direction to infer, through network layers, an output. More specifically, the feed-forward network may transmit information to an output node through multiple input nodes, weights, and activation functions. In this case, the weights may be updated (e.g. from initial random values) during a training process. The feed-forward network may also be referred to as a multi-layer perceptron (MLP) and may include one or more hidden layers. As described below with reference to FIG. 3, the feed-forward network may be trained through an inductive bias that reflects the knowledge of an expert in a target process. The feed-forward network may infer probabilities of respective suspected process candidates.

The adapter 231 may perform metric learning for an extended search and similarity calculation. The metric learning may involve defining a distance function by quantifying a similarity between pairs of data (e.g., training pairs of the first and second modality) and training such that distance between the pieces in the pairs of data may get closer or further. The distance function may be defined by, for example, a Euclidean distance, a cosine similarity, a Mahalanobis distance, or a Wasserstein distance, or may be defined by data characteristics. The adapter 231 may be trained by performing the metric learning such that the pieces of data in a pair having the same suspected process may have an increased similarity, that is, may get closer in distance.

The retriever 233 may search for similar cases to the query vector from a DB 220. The retriever 233 may search for and derive a suspected process that matches the query vector and may search for at least one similar case including the suspected process. In this case, the similar cases that are searched for by the retriever 233 may include, for example, some cases that have gone through a process that is not performed in the target process and/or some cases not related to defect history included in the production information 209.

As described with reference to FIG. 3, the retriever 233 may calculate similarities between the query vector and sample cases in the DB 220 to find a similar case. The similarity between a sample case the query vector may be calculated based on a scaled dot-product attention, for example. The retriever 233 may search for a suspected process through non-parametric classification, which converts the similarity between the query vector and a sample case (from the DB 220) into a probability of the sample case being a suspected process (based on its similarity to the query vector). The retriever 233 may be trained based on cross-entropy corresponding to an occurrence probability of suspected process(es) similar to the query vector.

The masking module 235 may derive a suspected process by masking some of the sample cases determined to be similar to the query vector based on the production information 209 (an example is shown in curly braces at the bottom of FIG. 2). Note that the production information 209 may be converted by the processor 211 at or before the masking module 235 performs masking. The masking module 235 may exclude (remove) some sample cases not sufficiently related to the defect history included in the production information 209 through masking. In addition, the masking module 235 may exclude (or remove) some sample cases that have gone through a process not performed in the target process.

If some sample cases are removed by the masking module 235 among the suspected process(es) (sample cases) similar to the query vector, the data frame module 237 may match a suspected chamber and a suspected facility corresponding to a suspected process derived by an unmasked similar case with reference to the production information 209.

The data frame module 237 may collect information identifying the suspected process derived by the masking module 235 (e.g., a sufficiently similar sample case), and the suspected facility and the suspected chamber that are matched with the suspected process and convert that information into a standardized form (e.g., a data frame). The operations of the encoder module 210 and the matching module 230 are described with reference to FIG. 3.

The paraphrasing module 250 may generate a prompt based on the user's inquiry 260 and the at least one similar case that is searched for in the matching module 230. The prompt may be input to the LLM 270. The paraphrasing module 250 may generate the prompt for the LLM 270 based on the user's inquiry 260, the suspected process, the suspected facility, and/or the suspected chamber. The paraphrasing module 250 may convert the user's inquiry 260, the suspected process, the suspected facility, and the suspected chamber into the prompt for the LLM 270.

The LLM 270 may generate a response corresponding to the user's inquiry 260 by using the prompt received from the paraphrasing module 250.

Figure 3:
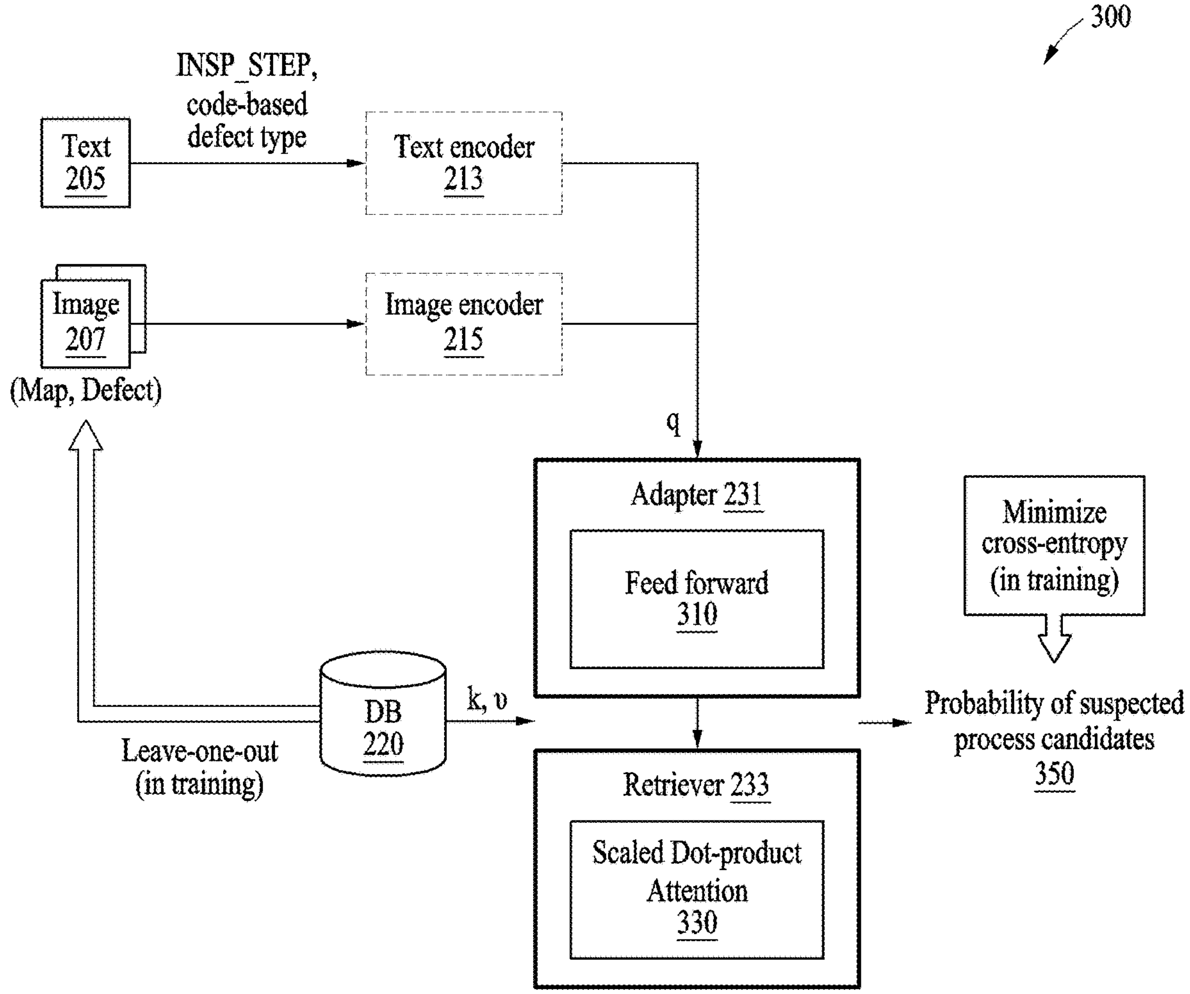
FIG. 3 illustrates an example of an operation of an encoder module and an operation of a matching module, according to one or more embodiments.
Figure 4:
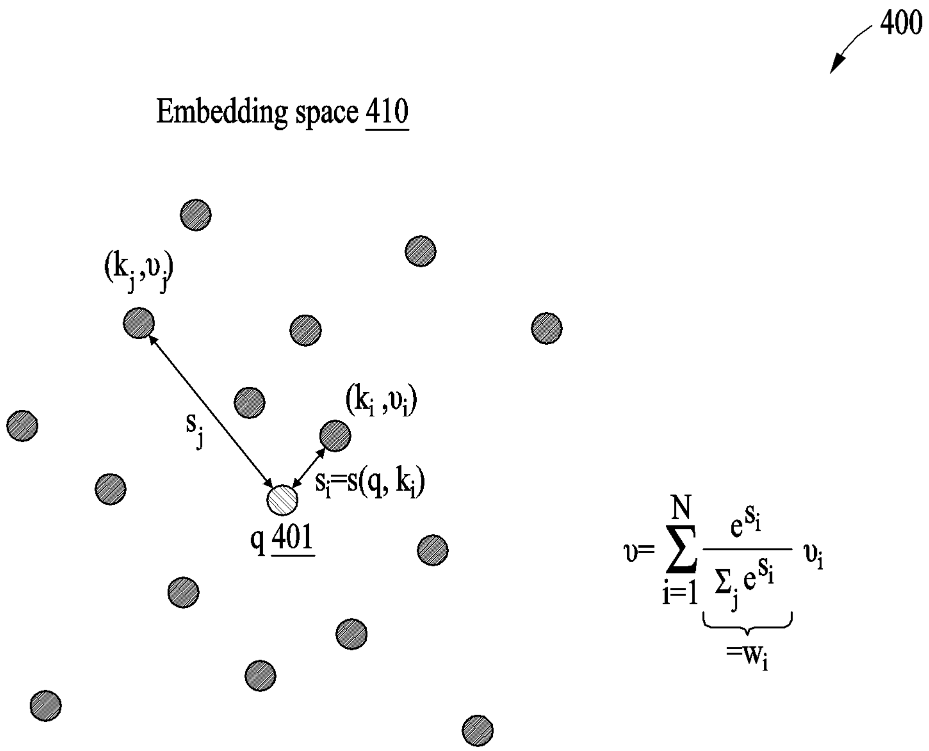
FIG. 4 illustrates an example of a method of searching for at least one similar case that matches a query vector, according to one or more embodiments.

FIG. 3 illustrates an example of an operation of an encoder module and an operation of a matching module, according to one or more embodiments, and FIG. 4 illustrates an example of searching for at least one similar case that matches a query vector, according to one or more embodiments.

Referring to FIG. 3, diagram 300 illustrates an operation and training method of the adapter 231 and the retriever 233 of the matching module, according to one or more embodiments.

A recommendation device may obtain a first embedding vector for text information (e.g., LOT information related to a target process, an inspection step related to the target process, wafer information, a defect-type code, production information, etc.) by the first encoder 213, may obtain a second embedding vector for image information (e.g., a defect image corresponding to a defect phenomenon, a pattern of a defect map corresponding to the defect phenomenon, etc.) by the second encoder 215, and then, may fuse the first embedding vector and the second embedding vector through the adapter 231. For example, the recommendation device may perform grounding between the first embedding vector for the text information and the second embedding vector for the image information by using a foundation model such as a clip.

The adapter 231 may convert the first feature obtained from the first encoder 213 and the second feature obtained from the second encoder 215 into the query vector ("q" in FIG. 3). For example, the adapter 231 may fuse or synthesize two types of features, the first feature and the second feature, through a feed-forward network 310 and may convert it into one query vector q.

For example, when a query corresponding to the text information (e.g., the LOT information related to the target process, the inspection step related to the target process, the wafer information, the defect-type code, the production information, etc.) and the image information (e.g., the defect image corresponding to the defect phenomenon, the pattern of the defect map corresponding to the defect phenomenon, etc.) is inputted, the recommendation device (the matching module) may search for and output whichever of the sample cases from the DB 220 is determined to be the most similar case to the query. To this end, the adapter 231 may convert the two types/modalities of features obtained by encoding the text information and the image information into one query vector q through the feed-forward network 310. For example, the feed-forward network 310 may be trained through an inductive bias that reflects the knowledge of an expert in the target process. The feed-forward network 310 may calculate probabilities 350 of respective candidates of a suspected process through a key vector k and a value vector v that are searched for in the DB 220, based on the query vector q. The feed-forward network 310 may learn a small number of parameters from data through the inductive bias.

Alternatively, the feed-forward network 310 may minimize the inductive bias but may generalize the knowledge of an expert to an attention value configured for non-parametric classification and may classify defect phenomena (defect cases) in a one-hot encoding form. In this case, the feed-forward network 310 may allow the probability 350 of candidates of suspected processes respectively corresponding to the defect phenomena to be derived based on a similarity between the query vector q and the key vector k.

Here, "inductive bias" refers to an additional assumption used to accurately predict a situation that has not been met during learning. Machine learning aims to build an algorithm for learning a certain target, and to this end, limited pieces of input and output data may be given. All machine learning algorithms having the ability to generalize data other than training data may have any type of inductive bias. Such an inductive bias may be an assumption under which a neural network model learns a target function and generalizes data beyond the training data. If redefining the inductive bias from bias perspectives, it is a bias acquired in a learning process to determine data when data of a distribution not seen by a neural network model during the learning process is input.

Examples of inductive bias include translation invariance in which an object is recognized even if a position of the object changes when providing an image including the object, translation equivariance in which an activation position of an operation, such as a convolutional neural network (CNN), when the position of the object changes when providing the image including the object, or nearest neighbors in which most of the small neighbors in a feature space are assumed to belong to the same class, but examples are not limited to the foregoing examples.

Returning to the adapter 231, the query vector q may be input to the retriever 233 including a scaled dot-product attention 330 together with a key vector k and a value vector v output from a DB 220. The retriever 233 may output a probability (e.g., the probability 350 of candidates of suspected processes) of a similar case corresponding to the query vector q through the scaled dot-product attention 330 for the query vector q, the key vector k, and the value vector v. The retriever 233 may use one layer of the scaled dot-product attention 330.

A transformer may calculate an attention value through the scaled dot-product attention 330. The scaled dot-product attention 330 may correspond to the scaling of the dot product attention by using a length $d_k$ of a key and a query. An example of an attention value according to the scaled dot-product attention 330 is represented by Equation 1 below.

$$\text{Attention}(Q, K, V) = \text{Softmax}\left(\frac{QK^T}{\sqrt{d_k}}\right)V \qquad \text{Equation 1}$$

A similarity between the query vector Q and the key vector K may be normalized to a probability value between 0 to 1 through the scaled dot-product attention 330. The query vector Q, the key vector K, and the value vector V may correspond to, for example, a sentence matrix having a word vector as a row, but examples are not limited thereto. A dot product, that is, the dot product of vectors, may be used to compute a similarity of the vectors. The scaled dot-product attention 330 using a certain value (e.g., the length $d_k$ of the key and the query) as a denominator may be used for scaling that adjusts a value size. Here, T denotes a transpose. $QK^T$ denotes an outer product between the query vector Q and the key vector K.

As shown in Equation 1, the recommendation device may calculate an attention score and an attention distribution corresponding to each query vector Q for all the key vectors K and may obtain an attention value or a context vector by performing a weighted sum on all the value vectors V by using the attention score and the attention distribution. This process may be performed repeatedly on all of the query vectors Q.

After obtaining a similarity between word vectors through a dot product, the recommendation device may obtain a similarity between the query vector Q and the key vector K in a method of dividing a certain value (e.g., the length $d_k$ of the key and the query) by a denominator. The retriever 233 may convert available information for each case (e.g., a defect phenomenon) into a feature (e.g., the query vector Q). In this case, the available information may be information related to the defect phenomenon, including the LOT information related to the target process, the inspection step related to the target process, the wafer information, the defect-type code, the production information, the defect image corresponding to the defect phenomenon, and the pattern of the defect map corresponding to the defect phenomenon.

For example, the retriever 233 may extract, from the DB 220, a suspected process among similar cases to the query vector q through a scaled dot-product attention of the value vector v and the key vector k of a past case stored in the DB 220 by learning an attention block.

The retriever 233 may search, from the DB 220, for the value vector v and the key vector k corresponding to similar cases to the query vector. The retriever 233 may search for at least one similar case including a suspected process that matches the query vector q. When the suspected process is derived by the retriever 233, the matching module 230 may match a suspect facility and a suspected chamber, corresponding to the suspected process, with reference to the production information 209.

The retriever 233 may calculate a similarity s between past similar cases and the query vector q corresponding to a current defect phenomenon (defect case), based on a multi-modality.

The retriever 233 may convert the calculated similarity s into the probability 350 of suspected case candidates through non-parametric classification. The key here is finding a feature space suitable for calculating the similarity s.

The feature space suitable for calculating the similarity s between the query vector q and similar cases ($k_i$, $v_i$) may be an embedding space 410 as shown in FIG. 4.

In addition, in the embedding space 410, the value vector v may be calculated by a distance between a query vector q 401 and ($k_i$, $v_i$). For example, the value vector v may be represented by Equation 2 below.

$$v = \sum_{i=1}^{N} \underbrace{\frac{e^{s_i}}{\sum_j e^{s_j}}}_{=\omega_i} v_i \qquad \text{Equation 2}$$

Here, a similarity $s_i$=s(q, $k_i$) may refer to a cosine similarity between a pair of ($k_i$, $v_i$) and the query vector q 401. In addition, the similarity $s_j$ may be a similarity between a pair of ($k_j$, $v_j$) and the query vector q 401. Here, q, k denotes a combination feature of text information (e.g., an inspection step, a defect code-based prompt, etc.) and image information (e.g., a defect image). A pair of ($k_i$, $v_i$) and a pair of ($k_j$, $v_j$) may be stored in advance in the DB 220.

q, k may include, for example, defect occurrence date and time, a LOT ID, the suspected facility, the inspection step, a number of an inspected wafer, a number of a wafer where a defect has occurred, the code classification of a defect map, or a defect class, but examples are not limited thereto.

In addition, v may be information (e.g., information on the suspected process, the suspected facility, and the suspected chamber) that the recommendation device desires to obtain, and may have, for example, a one-hot-encoding form of the suspected case. v may include, for example, classification of the defect class, like "Top1 SuspWordXA 123280E-12.3 PUNCH-MODE ETCH [EUV] [5000 MIN] ETOHZ36-5chamber". v may be stored in a DB.

N denotes the number of all pairs of keys k and values v stored in the DB, and $w_i$ denotes a weight. i denotes a sample index.

A neural network model including the adapter 231 and the retriever 233 may configure a query through a leave-one-out cross validation (LOOCV) technique and may be trained to minimize cross-entropy of the probability 350 of the candidates of suspected processes. Here, the LOOCV technique may determine one dataset among n pieces of data stored in the DB 220 and may perform modeling with the remaining n−1 pieces of data. According to the LOOCV technique, when one piece of data is given as a query, the recommendation device may estimate the probabilities of a class of a suspected processes through remaining cases and may train the neural network model to minimize the cross-entropy of the estimated probability.

Figure 5:
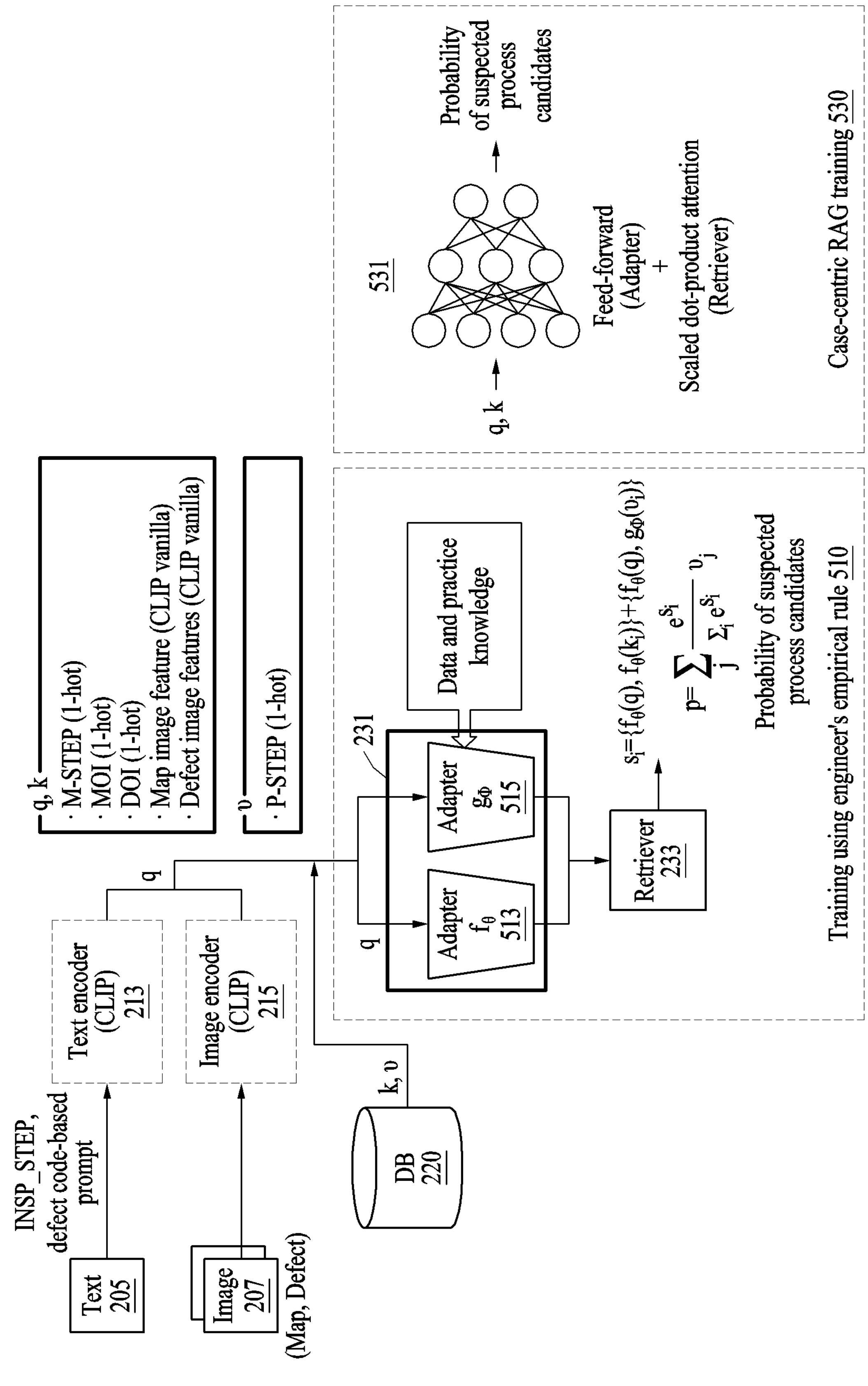
FIG. 5 illustrates an example of a method of training a matching module, according to one or more embodiments.

FIG. 5 illustrates an example of a method of training a matching module, according to one or more embodiments. Referring to FIG. 5, diagram 510 illustrates a method of training the adapter 231 and the retriever 233 by using the empirical rule of an expert, according to an embodiment, and diagram 530 illustrating the method of training the adapter 231 and the retriever 233 through case-centric retriever augmented generation (RAG).

A recommendation device may encode information related to a defect phenomenon to generate a query vector q and may search for at least one similar case related to the defect phenomenon through a similarity $s_i$ between the query vector q and a key vector k and a value vector v that are stored in a DB. In this case, in the process of searching for a similar case, the empirical rule of an expert may be used as shown in diagram 510, or the RAG may be used as shown in diagram 530.

Here, (q,k) may be an inspection step M-STEP (1-hot), a map of interest (MOI) (1-hot) representing a class of a defect map, a defect of interest (DOI) (1-hot) representing a class of the defect phenomenon, map image features (CLIP vanilla), and defect image features (CLIP vanilla). In addition, v may be P-STEP (1-hot).

For example, the recommendation device may search for a key and a value corresponding to text information of an inspection step and a defect classification code and may find a suspected process that matches the searched key and value through the adapter 231 and the retriever 233. In this case, the retriever 233 may be implemented through an inductive bias based on a practice and/or knowledge of an expert. For example, the retriever 233 implemented through the inductive bias may obtain the probability p of suspected process candidates as shown in Equation 3.

$$s_i = \langle f_\theta(q), f_\theta(k_i)\rangle + \langle f_\theta(q), g_\phi(v_i)\rangle \qquad \text{Equation 3}$$

$$p = \sum_j \frac{e^{s_j}}{\sum_i e^{s_i}} v_j$$

Here, $f_\theta$ denotes an adapter that processes the query vector q and the key vector k and $g_\phi$ denotes an adapter that processes the value vector v. $e^{s_j}$ may be an exponential function representing a similarity with a component j, and $e^{s_i}$ may be an exponential function representing a similarity with a component i. $v_j$ denotes a value vector corresponding to the component j. i and j may be indices of components.

The retriever 233 may calculate similarities of all samples through an inner product between a feature of the query vector q and the key vector k and a feature of the query vector q and the value vector v. The retriever 233 may obtain an occurrence probability p of each of the suspected process candidates by interpreting the calculated similarity as a Softmax probability for each sample.

The recommendation device may alleviate the inductive bias and may find a suspected process through the training of an attention-based neural network model 531 as shown in diagram 530. In this case, the neural network model 531 may be configured with an attention module of a retriever and a modality adapter as one block for multimodal RAG and may have learned an integrated feature suitable for similarity calculation. The recommendation device may improve the search performance of the neural network model 531 by relying on training regarding most of the conversions suitable for similarity calculation and expanding matching through the case-centric RAG.

The RAG may be a sophisticated AI mechanism that improves a function of an LLM by integrating a dynamic search system. The LLM may access and use the latest external data source through the RAG, and thus, may enhance a response through a wider range of information.

The core function of the RAG may be searching for relevant information (e.g., the query vector q and the key k) in the extensive DB 220 and the combining of two main processes (e.g., search mechanism and natural language processing (NLP)) that generate a contextually rich response based on the searched data.

First, the neural network model 531 of diagram 530 may perform a semantic search in the structured DB 220 that is conceptualized as a vector space. In this case, the DB 220 may be a vector DB that stores information in a vector form. The DB 220 may store the systematic collection of numerical representations of various data points corresponding to information including text information and/or image information.

When receiving the query vector q, the RAG may search a vector space by using an algorithm and may identify data having the highest relevance to a query (e.g., a query vector). The search mechanism of the RAG may be designed to understand a semantic relationship between the query and DB content and may ensure the selected data is aligned according to the context and intent of the query.

Figure 7:
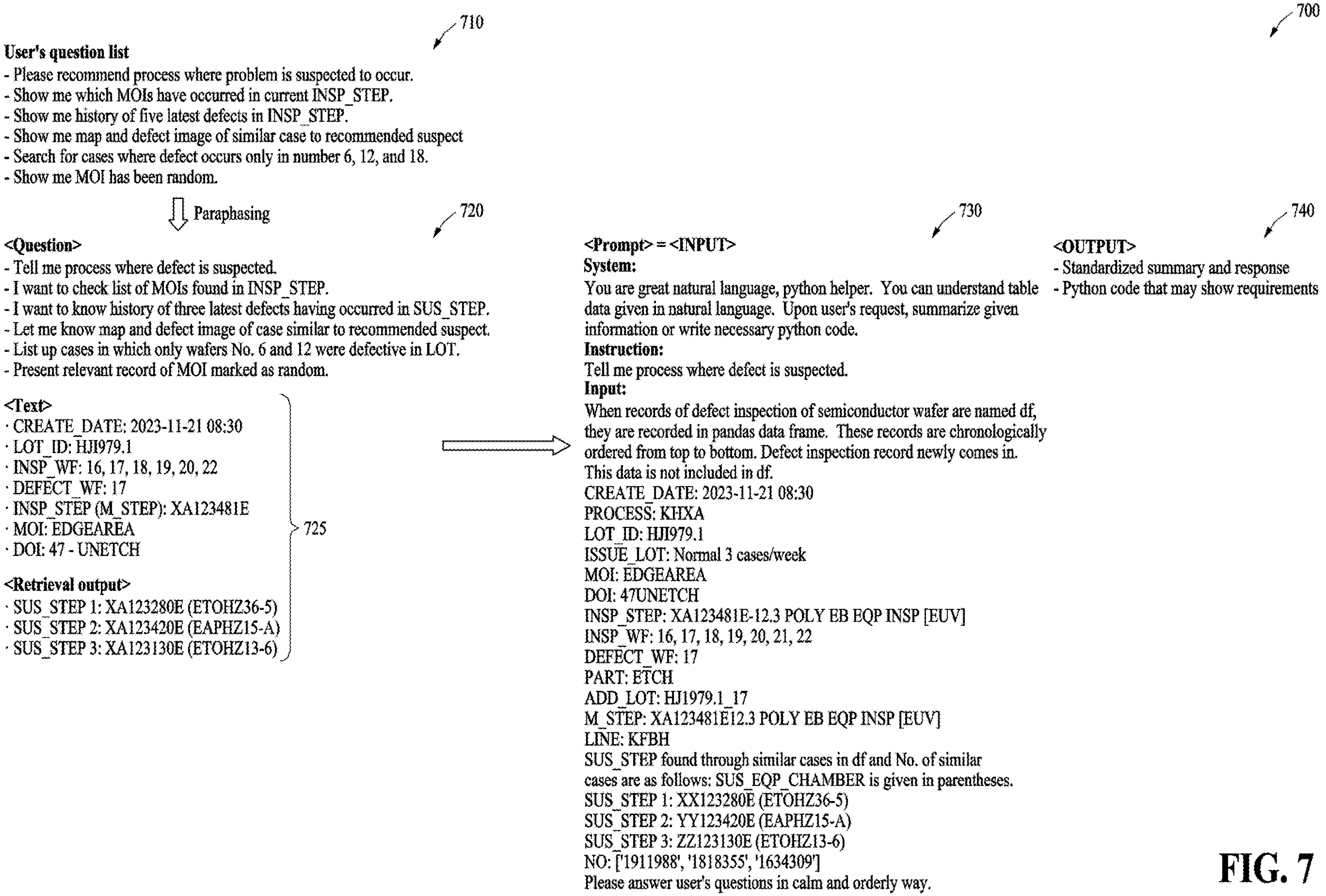
FIG. 7 illustrates an example of an input and output of the apparatus for recommending a defect-causing process, according to one or more embodiments.

An operation of the RAG may be understood through the following two main components (e.g., the search mechanism and the NLP):

(1) The search mechanism may correspond to an initial process of the RAG. The recommendation device may search for data that is semantically related to the query vector q input through the search mechanism in the vector DB. In the search mechanism, a sophisticated algorithm may analyze a relationship between content stored in a DB and the query and may identify the most appropriate information and an accurate response; and (2) The NLP may correspond to a process of performing the NLP on data where an LLM is searched for. The neural network model 531 may integrate information searched for through the search mechanism into a response by using various NLP techniques. The recommendation device may ensure the results are factually accurate, linguistically consistent, and contextually appropriate through the NLP. In addition, the recommendation device may perform instruction tuning, as shown in FIG. 7, on a pre-trained LLM to improve response performance for sentences of the LLM.

Figure 6:
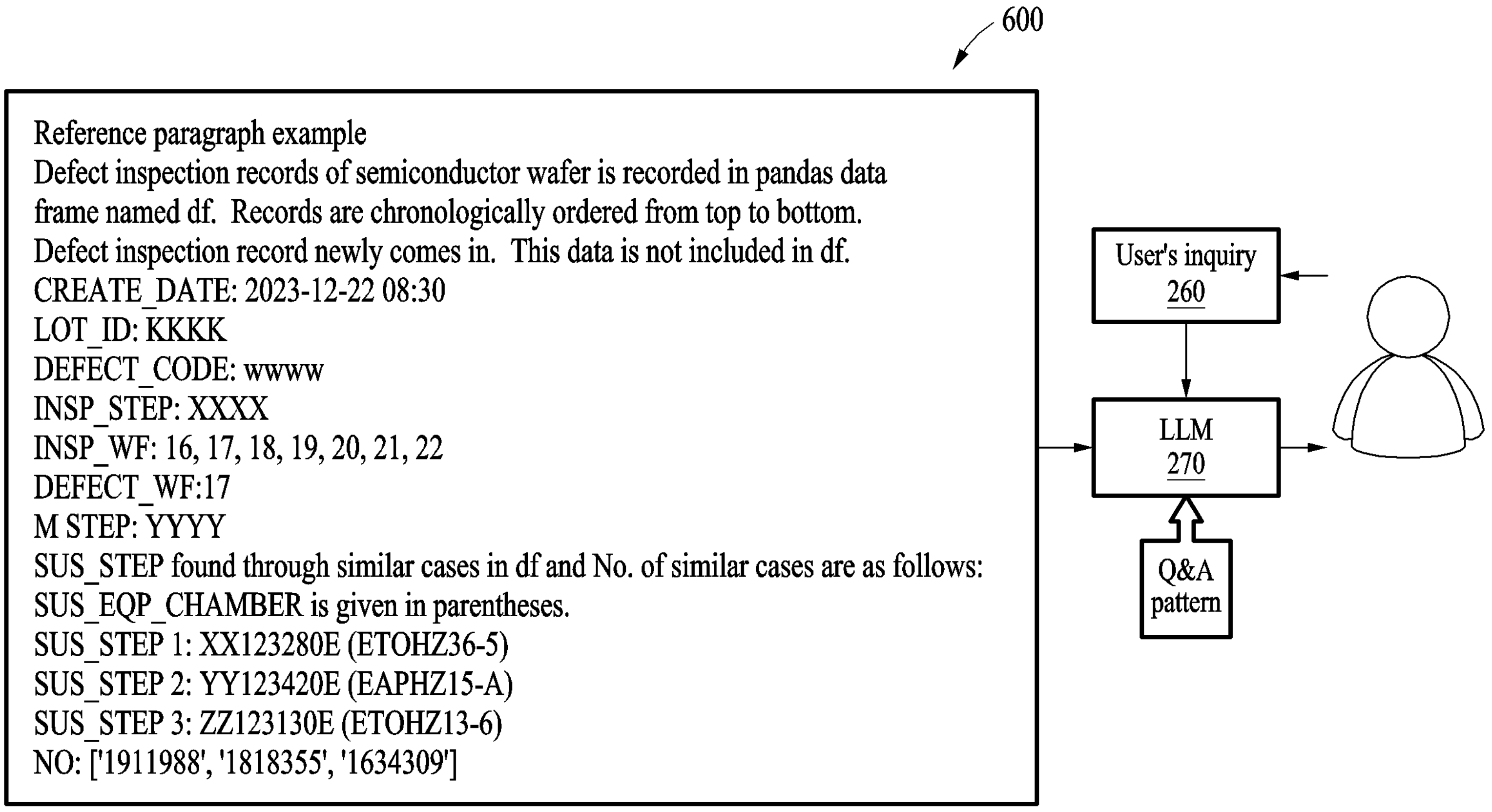
FIG. 6 illustrates an example of a prompt that a paraphrasing module generates, according to one or more embodiments.

FIG. 6 illustrates an example of a prompt that a paraphrasing module generates, according to one or more embodiments. Referring to FIG. 6, a diagram illustrating an example of a prompt 600 generated by the paraphrasing module, according to an embodiment, is provided.

A recommendation device may process information obtained through a retriever and provide the processed information as the prompt 600 in a reference paragraph form to the LLM 270. The LLM 270 may provide a response corresponding to the user's inquiry with reference to the prompt 600.

The prompt 600 may include LOT identification information (e.g., NO: ['1911988', '1818355', '1634309']) of the most similar case corresponding to a suspected process (see last line of the prompt 600). For example, the LOT identification information of the most similar case may be used to provide information corresponding to the user's inquiry, such as, "Let me know the most similar case to a defect phenomenon."

FIG. 7 illustrates an example of an input and output of the apparatus for recommending a defect-causing process, according to one or more embodiments. Referring to FIG. 7, diagram 700 illustrates an instruction tuning process performed by the LLM 270.

For example, when a user inputs the user's inquiry 710 in an instruction sentence form, like the user's question list, a recommendation device may generate and output a response 740 corresponding to the user's inquiry 710 in a Python code form that may show the user's requirements and/or in a sentence form, like standardized summary and response.

In this case, the recommendation device may variously paraphrase each instruction included in the user's inquiry 710 through an LLM and may convert variously paraphrased instructions into a sentence, like a question, as shown in diagram 720.

In this case, paraphrased sentences may have various forms, including, for example, "Show me a map and a defect image of a similar case to a recommended suspect," "Show me a map and a defect image of a similar case related to a recommended suspect," "Let me check a map and a defect image in a recommended case of a recommended suspect," "What are a map and a defect image of a similar case based on suspect recommendation?", "Let me know a map and a defect image of a similar case of a recommended suspect," "I want to check a map and a defect image in a case related to a recommended suspect," "Would you show me an image related to a map of a similar case according to suspect recommendation?", "Can I check a map and a defect image about a similar case of a recommended suspect?", "Present a map and a defect image of a similar case based on suspect recommendation," "Would you show me a map and a defect image of a similar case related to suspect recommendation?", "Let me know what a map and a defect image are in a similar case according to a recommended suspect," and "Show me a defect history {col1} the most recently occurs in {col0}."

The recommendation device may generate a prompt 730 through a search result (e.g., a data frame 725 in a form standardized by a data frame module) of a retriever and input data (e.g., variously paraphrased sentences, through an LLM, of each instruction included in the user's inquiry 710).

The LLM that receives the prompt 730 may respond by providing the response 740 including the recommendation of a suspected facility, a list of similar cases, or the summary of information provided to the prompt 730. In this case, the recommendation device may generate Python code to find a result desired by the user by using the LLM and may provide a user with a result of executing the Python code as the response 740.

The response 740 may be in a form, including, for example, "% s occurring in % s is {% s}. Let me show you the record of MOIs occurring in the same % s. \n'''Python\noutput=df[df[\"% s\"]==\"{% s}\"] [\"% s\"].value_counts( )\n'''" and "Let me show you the history of defects having occurred in a facility {% s}. \n'''Python\noutput=df[df[\"% s\"]=\"{% s}\"].tail(% d)\n'''" but examples are not limited thereto.

Figure 8:
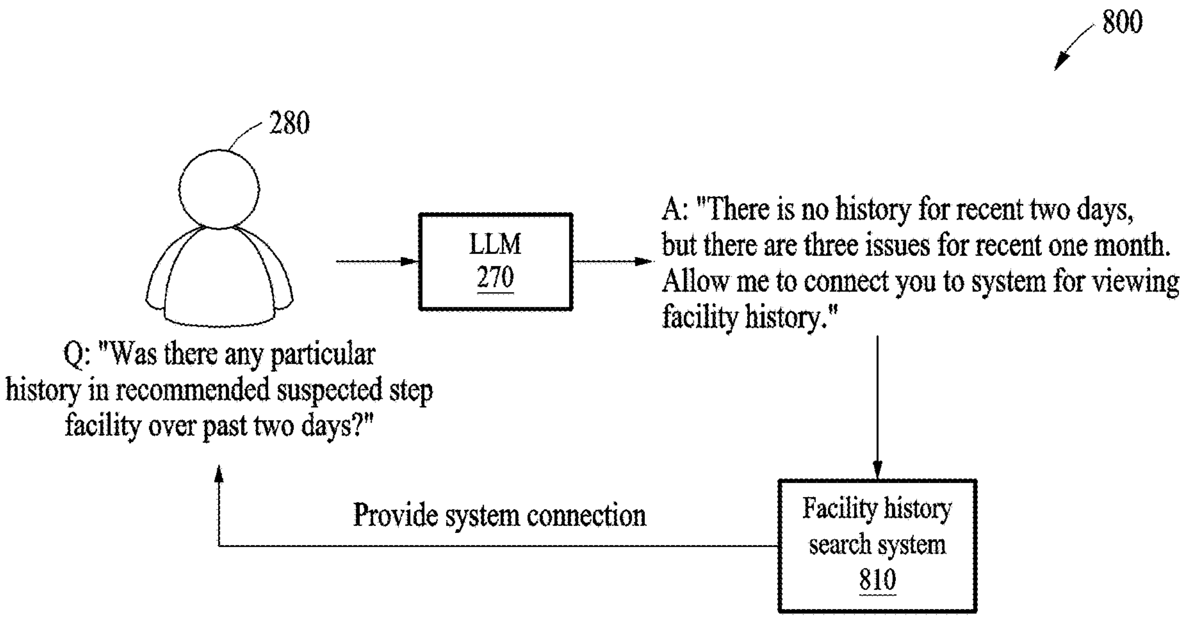
FIG. 8 illustrates an additional example of the apparatus for recommending a defect-causing process, according to one or more embodiments.

FIG. 8 illustrates an additional example of the apparatus for recommending a defect-causing process, according to one or more embodiments. Referring to FIG. 8, diagram 800 illustrates a method of a recommendation device inquiring into facility history through a facility history search system.

The recommendation device may process a user's various questions other than questions for the tracking/identifying of a suspected process. The recommendation device may find and show data that meets a condition in a DB, according to inquiries of the user 280, or may configure, coordinate, or manage an AI or a device for analysis and action.

If an accurate response to the user's inquiry is not possible (or no answer is found), the recommendation device may drive a suitable system (e.g., a facility history search system 810) among defect analysis programs typically used by the LLM 270, may connect the suitable system to the user, and may provide a system use manual. This allows the user who is not familiar with various systems developed for defect analysis to use those systems by enhancing the usability of each tool.

For example, the user 280's inquiry, "Was there any particular history in the recommended suspected step facility over the past two days?" may be input to the LLM 270. In this case, there may be a determination that it is impossible to clearly answer the user's inquiry, and the recommendation device may provide a response, such as, "There is no history for the recent two days, but there are three issues for the recent one month. Allow me to connect you to a system for viewing the facility history." to the user 280's inquiry, and then, may drive the facility history search system 810 and may connect the facility history search system 810 to the user.

Figure 9:
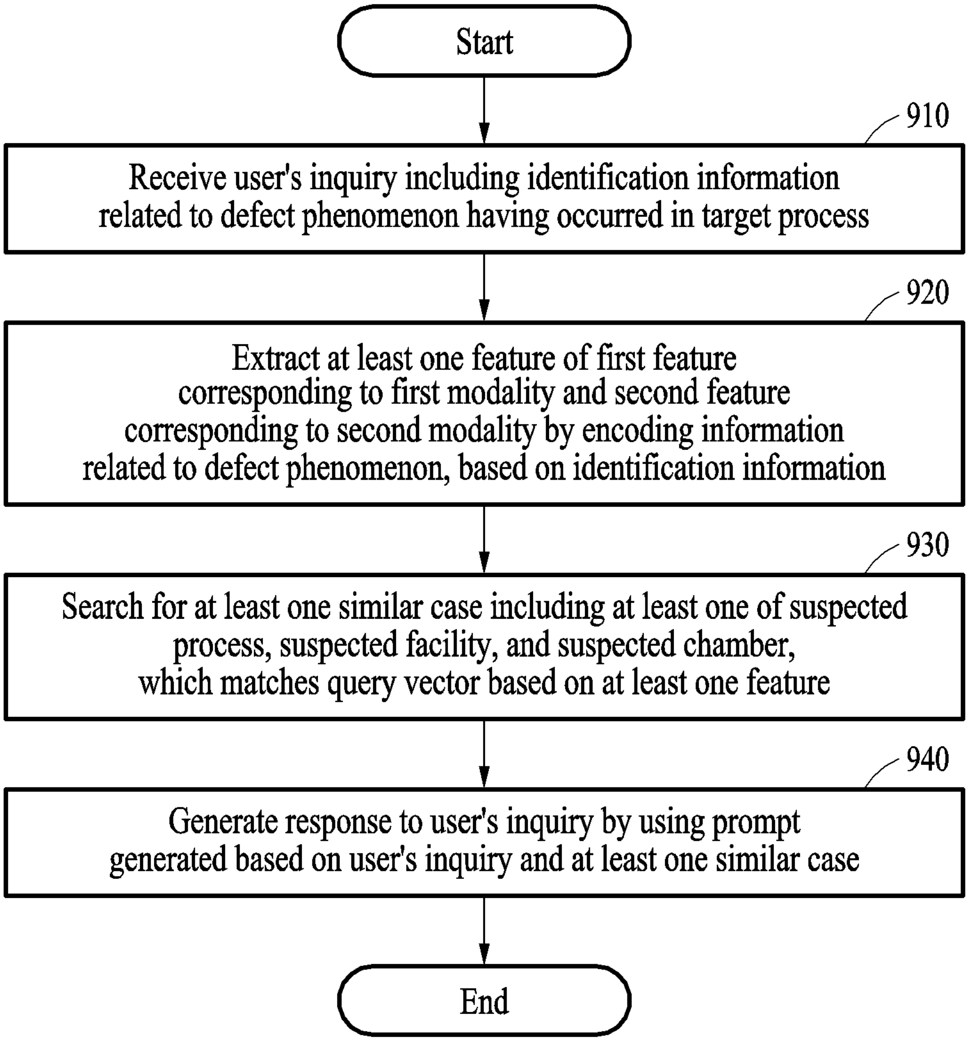
FIG. 9 is a flowchart illustrating a method of recommending a defect-causing process, according to one or more embodiments.

FIG. 9 illustrates a method of recommending a defect-causing process, according to one or more embodiments.

Referring to FIG. 9, a recommendation device, according to an embodiment, may generate a response corresponding to a user's inquiry through operations 910 to 940.

In operation 910, the recommendation device may receive the user's inquiry including identification information related to a defect phenomenon having occurred in a target process.

In operation 920, the recommendation device may extract a first feature corresponding to a first modality and/or a second feature corresponding to a second modality by encoding the information related to the defect phenomenon, based on the identification information received in operation 910. The recommendation device may preprocess (e.g., convert) the information related to the defect phenomenon into a form suitable for the encoding, and may do so based on the identification information. The recommendation device may extract the first feature included in the converted information related to the defect phenomenon and/or may extract the second feature included in the converted information related to the defect phenomenon.

In operation 930, the recommendation device may search a similar case (a suspected process, a suspected facility, and/or a suspected chamber) which matches a query vector, and may do so based on the first and/or second feature. The recommendation device may convert the first and/or second feature into the query vector. For example, the recommendation device may fuse the first feature and the second feature through a feed-forward network and may convert them into one query vector. The feed-forward network may be trained through an inductive bias that reflects the knowledge of an expert in the target process.

The recommendation device may search for the similar case including the suspected process that matches the query vector. For example, the recommendation device may calculate a similarity between the query vector and the at least one similar case, based on a scaled dot-product attention. The recommendation device may search for the suspected process through non-parametric classification, which converts the similarity into a probability of suspected processes similar to the query vector. The recommendation device may match the suspect facility and the suspected chamber, corresponding to the suspected process, with the query vector, based on production information.

In operation 940, the recommendation device may generate a response to the user's inquiry by using a prompt generated based on (i) the user's inquiry received in operation 910 and (ii) the at least one similar case searched for in operation 930.

Figure 10:
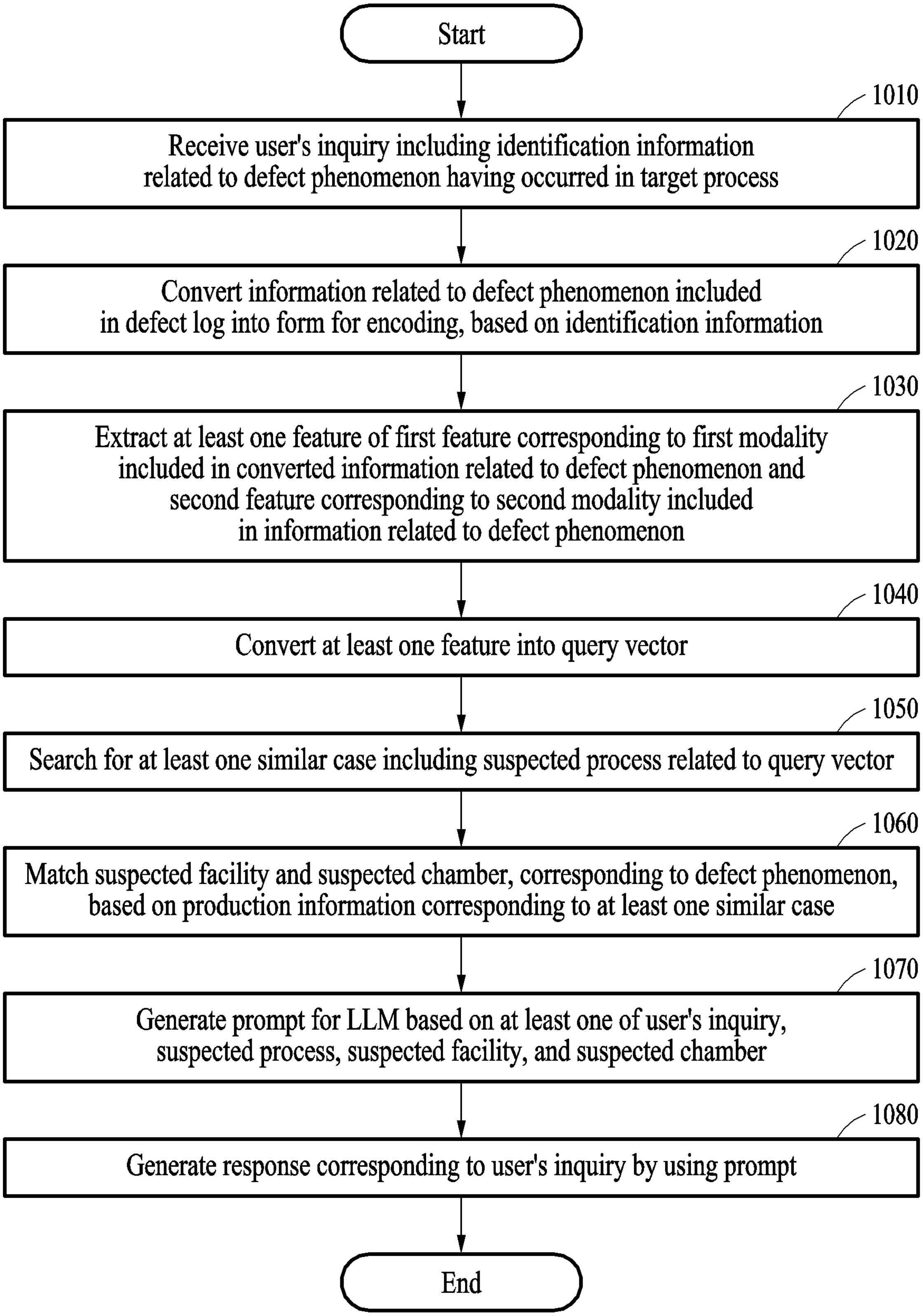
FIG. 10 is another flowchart illustrating the method of recommending a defect-causing process, according to one or more embodiments.

FIG. 10 illustrates the method of recommending a defect-causing process, according to one or more embodiments. Referring to FIG. 10, a recommendation device may generate a response corresponding to a user's inquiry through operations 1010 to 1080.

In operation 1010, the recommendation device may receive the user's inquiry including identification information related to a defect phenomenon having occurred in a target process.

In operation 1020, the recommendation device may convert the information related to the defect phenomenon included in a defect log into a form for encoding, based on the identification information received in operation 1010.

In operation 1030, the recommendation device may extract at least one feature of a first feature corresponding to a first modality included in the converted information related to the defect phenomenon and a second feature corresponding to a second modality included in the information related to the defect phenomenon, which is converted in operation 1020.

In operation 1040, the recommendation device may convert the at least one feature extracted in operation 1030 into a query vector.

In operation 1050, the recommendation device may search for at least one similar case including a suspected process related to the query vector converted in operation 1040.

In operation 1060, the recommendation device may match a suspected facility and a suspected chamber, corresponding to the defect phenomenon, based on production information corresponding to the at least one similar case searched for in operation 1050.

In operation 1070, the recommendation device may generate the prompt for an LLM based on at least one of the user's inquiry received in operation 1010, the suspected process searched for in operation 1050, the suspected facility matched in operation 1060, and the suspected chamber.

In operation 1080, the recommendation device may generate a response corresponding to the user's inquiry by using the prompt generated in operation 1070.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing unit also may access, store, manipulate, process, and generate data in response to execution of the software. For purpose of simplicity, the description of a processing unit is used as singular; however, one skilled in the art will appreciate that a processing unit may include multiple processing elements and multiple types of processing elements. For example, the processing unit may include a plurality of processors, or a single processor and a single controller. In addition, different processing configurations are possible, such as parallel processors.

The software may include instructions of a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The computing apparatuses, the electronic devices, the processors, the memories, the displays, the information output system and hardware, the storage devices, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROM, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An apparatus for recommending a defect-causing process, the apparatus comprising:
- one or more processors; and
- memory storing instructions configured to cause the one or more processors to:
  - receive a user's inquiry comprising identification information related to a defect phenomenon occurring in a target process;
  - convert information related to the defect phenomenon comprised in a defect log into a form for encoding, the information related to the defect phenomenon obtained based on the identification information;
  - extract a first feature corresponding to a first modality comprised in the converted information related to the defect phenomenon and/or a second feature corresponding to a second modality comprised in the converted information related to the defect phenomenon;
  - convert the first and/or second feature into a query vector;
  - search sample cases to determine a similar case, the similar case comprising a suspected process, a suspected facility, and/or a suspected chamber that matches the query vector;
  - mask by excluding, based on production information, at least some of the sample cases not performed in the target process and determined to be similar to the query vector;
  - match a suspected facility and a suspected chamber, corresponding to the defect phenomenon, based on the production information corresponding to the similar case;
  - generate a prompt for a large language model based on the user's inquiry, the suspected process, the suspected facility, and/or the suspected chamber; and
  - generate a response corresponding to the user's inquiry by using the prompt.

2. The apparatus of claim 1, wherein the apparatus comprises a neural network model as a transformer-based encoder network comprising at least one of:

a preprocessor configured to convert the information related to the defect phenomenon into the form for the encoding, based on the identification information;

a first encoder configured to extract the first feature from the converted information related to the defect phenomenon; or a second encoder configured to extract the second feature from the converted information related to the defect phenomenon.

3. The apparatus of claim 2, wherein the neural network model is further configured to match the suspected facility and the suspected chamber, corresponding to the suspected process, with the query vector, based on the production information.

4. The apparatus of claim 2, wherein the neural network mode is further configured to:

convert the first feature and the second feature into the query vector;

search the sample cases to find the similar case; and derive the suspected process by masking, based on the production information, the at least some of the sample cases.

5. The apparatus of claim 4, wherein the neural network model is further configured to:

fuse the first feature and the second feature through a feed-forward network; and convert the fusion of the first and second features into the query vector.

6. The apparatus of claim 5, wherein the feed-forward network is:

trained through an inductive bias that reflects the knowledge of an expert in the target process, and configured to calculate probabilities of candidates of the suspected process.

7. The apparatus of claim 4, wherein the neural network model is configured to:

calculate a similarity between the query vector and the similar case based on a scaled dot-product attention, and search for the suspected process through non-parametric classification, which converts the similarity into probabilities of suspected processes similar to the query vector.

8. The apparatus of claim 4, wherein the neural network model is trained based on cross-entropy corresponding to occurrence probabilities of suspected processes similar to the query vector.

9. The apparatus of claim 4, wherein the neural network model is further configured to:

collect the suspected process, the suspected facility, and the suspected chamber corresponding to an unmasked similar case and convert the collected suspected process, facility, and chamber into information in a standardized form.

10. The apparatus of claim 2, wherein the first modality comprises text information, and the second modality comprises image information.

11. The apparatus of claim 6, wherein the response corresponding to the user's inquiry comprises:

a response reflecting the user's inquiry, the suspected process, the suspected facility, the suspected chamber, and/or the at least one similar case.

12. The apparatus of claim 1, wherein the information related to the defect phenomenon comprises:

at least one piece of text information of LOT information related to the target process, an inspection step related to the target process, wafer information, a defect-type code, and production information; and image information comprising a defect image corresponding to the defect phenomenon or a pattern of a defect map corresponding to the defect phenomenon.

13. A processor-implemented method of recommending a defect-causing process performed by one or more processors, the method comprising:

receiving a user's inquiry comprising identification information related to a defect phenomenon occurring in a target process;

converting information related to the defect phenomenon comprised in a defect log into a form for encoding, the information related to the defect phenomenon obtained based on the identification information;

extracting a first feature corresponding to a first modality comprised in the converted information related to the defect phenomenon and/or a second feature corresponding to a second modality comprised in the converted information related to the defect phenomenon;

converting the first and/or second feature into a query vector;

searching sample cases to determine for a similar case, the similar case comprising a suspected process, a suspected facility, and/or a suspected chamber that matches the query vector;

masking by excluding, based on production information, at least some of the sample cases not performed in the target process and determined to be similar to the query vector;

matching a suspected facility and a suspected chamber, corresponding to the defect phenomenon, based on the production information corresponding to the similar case;

generating a prompt for a large language model based on the user's inquiry, the suspected process, the suspected facility, and/or the suspected chamber; and generating a response to the user's inquiry by using the prompt.

14. The method of claim 13, wherein the searching for the similar case comprises:

calculating a similarity between the query vector and the similar case based on a scaled dot-product attention;

searching for the suspected process through non-parametric classification, which converts the similarity into a probability of suspected processes similar to the query vector; and matching the suspect facility and the suspected chamber, corresponding to the suspected process, with the query vector, based on the production information.

15. A non-transitory computer-readable medium having stored there on instructions to implement a processor-implemented method of recommending a defect-causing process, the method performed by one or more processors and comprising:

receiving a user's inquiry comprising identification information related to a defect phenomenon occurring in a target process;

converting information related to the defect phenomenon comprised in a defect log into a form for encoding, the information related to the defect phenomenon obtained based on the identification information;

extracting a first feature corresponding to a first modality comprised in the converted information related to the defect phenomenon and/or a second feature corresponding to a second modality comprised in the converted information related to the defect phenomenon;

converting the first and/or second feature into a query vector;

searching sample cases to determine a similar case, the similar case comprising a suspected process, a suspected facility, and/or a suspected chamber that matches the query vector;

masking by excluding, based on production information, at least some of the sample cases not performed in the target process and determined to be similar to the query vector;

matching a suspected facility and a suspected chamber, corresponding to the defect phenomenon, based on the production information corresponding to the similar case;

generating a prompt for a large language model based on the user's inquiry, the suspected process, the suspected facility, and/or the suspected chamber; and generating a response corresponding to the user's inquiry by using the prompt.

* * * * *